2,760,967
Patented Aug. 28, 1956

2,760,967
ACID DYESTUFFS OF THE ANTHRAQUINONE SERIES

Peter Hindermann, Batterie, Basel, and Jean-Pierre Jung, Riehen, near Basel, Switzerland, assignors to J. R. Geigy A. G., Basel, Switzerland, a Swiss firm No Drawing. Application July 20, 1953,
Serial No. 369,227

Claims priority, application Switzerland July 31, 1952

8 Claims. (Cl. 260—374)

The present invention concerns the production of new, acid dyestuffs of the anthraquinone series which are distinguished by an excellent affinity to natural and synthetic polypeptide fibres.

It has been found that new, very valuable acid dyestuffs of the anthraquinone series are obtained if an anthraquinone compound having two exchangeable substituents in the α-positions and which can be further substituted if desired is reacted with 4-aminodiphenyl thioethers which may be further substituted non-ionogenically and the anthraquinone-bis-(p-phenylmercaptophenylamino)-compounds so obtained are sulphonated.

The new dyestuffs dye natural and synthetic polypeptide fibres such as wool, silk, lanital fibres, nylon and Perlon in very fast, particularly in very wet-fast red-violet, violet or green shades dependent on the composition of the dyestuff. They are distinguished from previously known comparable dyestuffs by their considerably improved drawing power on to wool from a neutral bath.

Anthraquinone compounds having two exchangeable substituents in the α-position which can be used for example in the process according to the present invention are: 1.4-, 1.5- and 1.8-dichloro- or dibromo-anthraquinones, 1.5- or 1.8-dinitroanthraquinones, 1.4-, 1.5- and 1.8-nitrochloro- or nitrobromo-anthraquinones, further 1.4-dihydroxy-, diamino- or hydroxyamino-anthraquinones or the leuco compounds thereof, all of which if desired may have further non-exchangeable substituents, for example halogen, in particular chlorine, in the β-position.

Amino compounds which can be used in the process according to the present invention are for example: 4-aminodiphenyl sulphide, 4-amino-2-, -2'-, or -4'-chloro- or -bromodiphenyl sulphide, 4-amino-2'- or -4'-methyldiphenyl sulphide, 4-amino-3'.4'-dimethyldiphenyl sulphide, 4-amino-4'-n-butyl- or tert. amyldiphenyl sulphide, 4-amino-3'-methyl-4'-chlorodiphenyl sulphide, 4-amino-4'-methoxydiphenyl sulphide. The dyestuffs according to this invention which are derived from 4-aminodiphenyl thioethers which are substituted by halogen or alkyl groups in the 4'-positions have particularly good drawing power.

The reaction of the anthraquinone compounds usable according to the present invention with the 4-aminodiphenyl thioethers is performed by melting the components together, advantageously by the use of an excess of aminodiphenyl sulphide compound, if necessary in the presence of organic solvents or diluents. As such may be used for example high boiling alcohols and hydrocarbons or inert chlorohydrocarbons. The usual catalysts or stabilisers such as copper and compounds thereof or boric acid can be added according to the anthraquinone compounds used. If 1.4-dihydroxy, aminohydroxy, or diamino compounds are used in the condensation, it is advantageous to use a part thereof in the form of their leuco compound. This is used either as such or can be produced in the reaction mass by reduction, e. g. with zinc and acids.

The 1.4-, 1.5- or 1.8-bis-(4'-phenylmercapto-phenylamino)-anthraquinone compounds which are obtained as water insoluble dye bases are then sulphonated in sulphuric acid monohydrate, if necessary with the addition of oleum or chlorosulphonic acid and converted into the water soluble alkali salts of sulphonic acids. As such they are dark powders which dissolve well in water and they dye polyamide fibres, particularly wool, in very wet fast and fast to light shades even from a weakly alkaline, neutral to weakly acid dyebath.

The following examples illustrate the invention without limiting it in any way. Where not otherwise stated, parts are given as parts by weight and the temperatures are in degrees centigrade. The relationship of parts by weight to parts by volume is as that of kilogrammes to litres.

Example 1

75.4 parts of 4-amino-4'-methyldiphenyl sulphide, 24 parts of 1.4-dihydroxy-anthraquinone and 8 parts of 30% hydrochloric acid are stirred at 80–90° and 2 parts of zinc dust are added within 20–30 minutes in small portions. After adding 5 parts of boric acid, the reaction mass is kept for 24 hours at 100–110°. 200 parts of n-butyl alcohol are then added, the whole is stirred for 30 minutes at 70°, and the condensation product which precipitates in crystalline form is filtered off. It is washed with 70° warm n-butyl alcohol and then made amine free by washing with greatly diluted mineral acid and finally washed with water. 1.4-bis-(4'-p-tolylmercapto-anilido)-anthraquinone is obtained in an excellent yield. After drying, the base is stirred into 5–10 times the amount of sulphuric acid monohydrate. The sulphonation mass is stirred at 15–40° until a sample completely dissolves in water. The dyestuff of the formula:

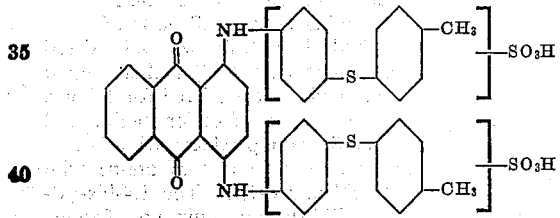

is worked up in the usual way. It dyes wool, silk and polyamide fibres in very fast green shades and is distinguished by its excellent drawing power from a neutral bath.

If instead of 75.4 parts of 4-amino-4'-methyldiphenyl sulphide, 70.5 parts of 4-aminodiphenyl sulphide, 75.4 parts of 4-amino-2'-methyldiphenyl sulphide, 81 parts of 4-amino-3'.4'-dimethyldiphenyl sulphide, 90 parts of 4-amino-4'-n-butyldiphenyl sulphide or 95 parts of 4-amino-4'-n-amyldiphenyl sulphide are used, dyestuffs are obtained which dye wool from a neutral bath in green shades which have corresponding wet and light fastness properties.

These dye bases can also be sulphonated with chlorosulphonic acid. 10 parts of the dye base are added to a mixture of 50 parts of sulphuric acid monohydrate and 5 parts of chlorosulphonic acid and the whole is stirred at 10–40° until the sulphonation is complete.

Example 2

215 parts of 4-amino-4'-methyldiphenyl sulphide are heated for 10 hours at 190–195° with 27.7 parts of 1.5-dichloroanthraquinone, 30 parts of potassium acetate and 0.2 part of cuprous chloride. After cooling, the melt is diluted with methanol. The condensation product precipitates in crystalline form. It is filtered off, washed with warm methyl alcohol, greatly diluted hydrochloric acid and water and then dried. 1.5-bis-(4'-p-tolylmercapto-anilido)-anthraquinone is obtained in a good yield and in a pure form.

10 parts of the condensation product are stirred at 20–25° into 8 times the amount of sulphuric acid monohydrate until a sample is water soluble. The dyestuff is precipitated by pouring the whole into a 5% sodium chloride solution, the precipitate is filtered off, the filter cakes are dissolved in 500 parts of water, neutralised with soda and the sodium salt of the dyestuff of the formula:

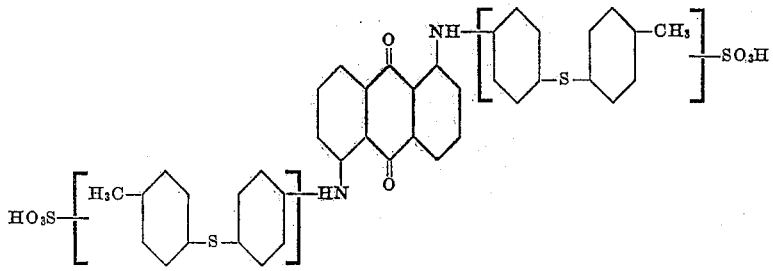

is isolated. It is a dark powder which dissolves in water with a violet and in concentrated sulphuric acid with a dull yellowish brown colour. The dyestuff has excellent drawing power from a neutral bath and it dyes wool, synthetic polyamide fibres and silk in very fast red-violet shades.

If the 215 parts of 4-amino-4'-methyldiphenyl sulphide are replaced by 201 parts of 4-aminodiphenyl sulphide or 257 parts of 4-amino-4'-n-butyldiphenyl sulphide or 271 parts of 4-amino-4'-n-amyldiphenyl sulphide, violet dyestuffs are obtained, the wool dyeings of which have similarly good washing, milling and light fastness properties.

*Example 3*

24 parts of 1.4-dihydroxy-anthraquinone and 83 parts of 4-amino-4'-chlorodiphenyl sulphide are melted together at 90°. 8 parts of 30% hydrochloric acid are added and then 2 parts of zinc dust are added within 20–30 minutes in small equal portions. After adding 4.7 parts of boric acid and 10 parts of n-butyl alcohol, the whole is stirred for 24 hours at 100–105°. The melt at 70° is then diluted with 150 parts of n-butyl alcohol, it is stirred for 1 hour, the condensation product is drawn off under suction and freed from adhesive resinification products with hot n-butyl alcohol. Finally it is washed free of amine with greatly diluted mineral acid and dried. The 1.4-bis-(4'-p-chlorophenylmercapto-anilido)-anthraquinone formed is obtained in an excellent yield and pure state and it can be sulphonated direct. 20 parts of the condensation product are stirred at 20–25° in 100 parts of sulphuric acid monohydrate until a sample is completely soluble in water. The sulphonation mixture is then poured onto a mixture of ice/sodium chloride, the dyestuff which precipitates is filtered off, neutralised in water with soda and the sodium salt of the dyestuff is isolated with sodium chloride. It corresponds to the formula:

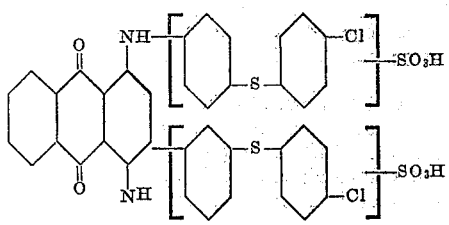

and is a dark powder which dissolves in water with a pure green-blue shade and in concentrated sulphuric acid with a reddish blue shade. It dyes wool, polyamide fibres, charged and uncharged silk from a neutral bath in very fast green shades.

If the 83 parts of 4-amino-4'-chlorodiphenyl sulphide are replaced by 98 parts of 4-amino-4'-bromodiphenyl sulphide or 94.6 parts of 4-amino-3'.4'-dichlorodiphenyl sulphide, green dyestuffs are obtained, the dyeings with which have similarly good fastness to washing, milling and light.

The sulphonation can also be performed in 5–10% oleum by stirring at 15–30°.

*Example 4*

83 parts of 4-amino-4'-chlorodiphenyl sulphide are stirred for 5–6 hours at 165–180° with 27.7 parts of 1.4-dichloroanthraquinone, 25 parts of potassium acetate and 0.1 part of cuprous chloride. The condensation product precipitates in crystalline form on the addition of 200 parts of n-butyl alcohol at 90° to the melt. It is filtered off and washed with warm n-butyl alcohol, greatly diluted mineral acid and warm water. After drying, the 1.4 - bis - (4' - p - chlorophenylmercapto - anilido) - anthraquinone, which is obtained in a good yield is stirred in 5 to 8 times the amount of sulphuric acid monohydrate until a sample is completely soluble in water. The dyestuff corresponds to that described in Example 3.

The same dyestuff is also obtained if, in the above example, 28.75 parts of 1-chloro-4-nitro-anthraquinone or 36.6 parts of 1.4-dibromo-anthraquinone are used instead of 27.7 parts of 1.4-dichloro-anthraquinone.

*Example 5*

235.5 parts of 4-amino-4'-chlorodiphenyl sulphide, 27.7 parts of 1.5-dichloroanthraquinone, 30 parts of potassium acetate and 0.3 part of copper acetate are stirred for 10 hours at 180–190°. 250 parts of n-butyl alcohol are added at 100°, the whole is stirred for another hour at 100° and then filtered at 60°. After washing with warm butyl alcohol and hot water, the condensation product is dried. A very good yield of 1.5-bis-(4'-p-chlorophenylmercapto-anilido)-anthraquinone is so obtained. It is a dark, violet-red crystalline powder which dissolves in concentrated sulphuric acid with a yellowish-brown colour.

10 parts of the condensation product are dissolved in 6 times the amount of sulphuric acid monohydrate and the solution is stirred at 25–30° until a sample is water soluble. The dyestuff of the formula:

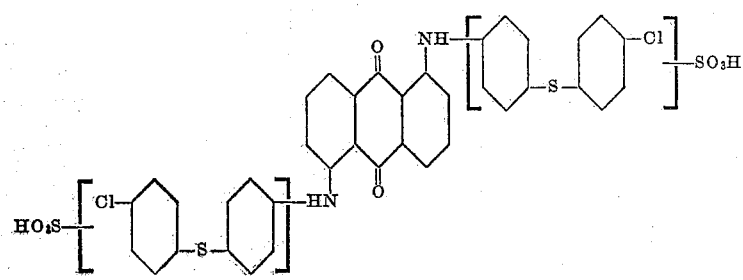

which is precipitated in the usual way is dried. It is a dark powder and dyes wool, synthetic polyamide fibres, charged and uncharged silk in red-violet shades which are fast to wet and light.

10 parts of the condensation product are dissolved in 8 times the amount of 5% oleum and the solution is stirred at 20–30° until a sample completely dissolves in water. The dyestuff of the formula:

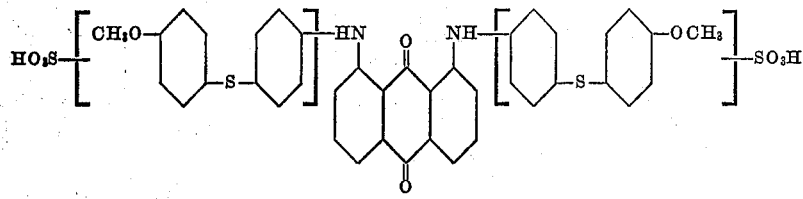

which has been isolated in the usual manner, dyes wool and silk from a neutral bath in fast, violet shades.

If instead of 27.7 parts of 1.8-dichloranthraquinone, 28.75 parts of 1-chloro-8-nitroanthraquinone or 33.2 parts of 1-bromo-8-nitroanthraquinone are used for the condensation, a dyestuff is obtained which dyes wool and silk in similarly fast, violet shades.

If, instead of 235.5 parts of 4-amino-4'-chlorodiphenyl sulphide, 280 parts of 4-amino-4'-bromodiphenyl sulphide or 270 parts of 4-amino-3'.4'-dichlorodiphenyl sulphide are used, a dyestuff is obtained which dyes wool from a neutral bath in red-violet shades having similarly good wet and light fastness properties.

Example 6

215 parts of 4-amino-4'-methyldiphenyl sulphide, 27.7 parts of 1.8-dichloranthraquinone, 30 parts of potassium acetate and 0.2 part of cuprous chloride are stirred at 190–195° for 12 hours. At the end of this time the condensation is complete. The product is allowed to cool to 60°, diluted with 300 parts of methanol and then boiled for 1 hour under reflux. 1.8-bis-(4'-p-tolylmercapto-anilido)-anthraquinone which precipitates in crystalline form is drawn off under suction, washed with a little cold methyl alcohol and dried. It is a dark crystalline powder which dissolves in concentrated sulphuric acid with a yellowish-green colour.

10 parts of the condensation product are dissolved in 6 times the amount of sulphuric acid monohydrate and sulphonated by stirring for several hours at 20–25°. The dyestuff of the formula:

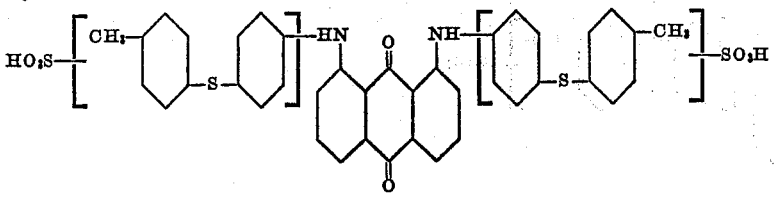

which has been converted into the sodium salt and isolated in the usual way, is dried. It is a dark powder and dyes wool, silk and synthetic polyamide fibres from a neutral bath in fast violet shades which have good fastness to washing, milling and light. If in the above example, the 215 parts of 4-amino-4'-methyldiphenyl sulphide are replaced by 235.5 parts of 4-amino-4'-chlorodiphenyl sulphide, a violet dyestuff is obtained which has similar good washing, milling and light fastness properties.

This dye base can also be sulphonated with chlorosulphonic acid. For example 10 parts of the dye base are added to a mixture of 50 parts of sulphuric acid monohydrate and 5 parts of chlorosulphonic acid and the whole is stirred at 20–24° until the sulphonation is complete. The dyestuff is worked up in the usual way. On careful sulphonation it is also possible to add less than 2 sulphonic acid groups; the dyestuffs so obtained also have good properties.

Example 7

231 parts of 4-amino-4'-methoxydiphenyl sulphide are heated for 10 hours at 180–190° with 27.7 parts of 1.8-dichloranthraquinone, 30 parts of potassium acetate and 0.2 part of cuprous chloride. After cooling to 50°, the melt is diluted with 400 parts of methyl alcohol. The condensation product precipitates in crystalline form. It is drawn off under suction, washed with warm methyl alcohol, diluted hydrochloric acid and finally with water and dried. A good yield of 1.8-(4'-p-methoxyphenylmercapto-anilido)-anthraquinone is obtained in a pure form in this manner.

lido)-anthraquinone so formed is obtained in a good yield and a pure state.

10 parts of the dyestuff base are dissolved in 5 times the amount of 5% oleum and stirred at 15–30° until a sample completely dissolves in water. The dyestuff which is isolated in the usual way corresponds to that described in Example 1.

Example 9

2 parts of zinc dust are added in small portions within 20–30 minutes to a melt made up from 27.45 parts of 6-chloro-1.4-dihydroxy-anthraquinone, 70.5 parts of 4-aminodiphenyl sulphide, 10 parts of n-amyl alcohol and 7 parts of 30% hydrochloric acid at a temperature of 90°. After adding 4.7 parts of boric acid and 10 parts of n-amyl alcohol, the whole is boiled under reflux for 24 hours. 150 parts of n-amyl alcohol are then added to the reaction mass which is then stirred for 30 minutes at 70°. The precipitate is filtered off, washed with 70° warm n-amyl alcohol, greatly diluted mineral acid and hot water and then dried. A good yield of 1.4-bis-(4'-phenylmercapto-anilido)-6-chloro-anthraquinone precipitates. It dissolves in toluene with a green and in concentrated sulphuric acid with a reddish blue colour.

10 parts of this dye base are dissolved in 50 parts of sulphuric acid monohydrate and stirred at 10–40° until

Example 8

A melt made up from 75.4 parts of 4-amino-4'-methyldiphenyl sulphide, 8.5 parts of 30% hydrochloric acid, 9.5 parts of leuco-1.4-diamino-anthraquinone, 14.5 parts of 1.4-diamino-anthraquinone and 5 parts of boric acid is stirred for 24 hours at 100–110°. 150 parts of n-butyl alcohol are added to the reaction mixture, the whole is stirred for a further hour at 80–90°, the precipitate is filtered off and purified with 70% n-butyl alcohol and then washed wtih greatly diluted mineral acid and water and finally dried. The 1.4-bis-(4'-p-tolylmercapto-ania sample is soluble in water. The dyestuff, worked up in the usual way of the formula:

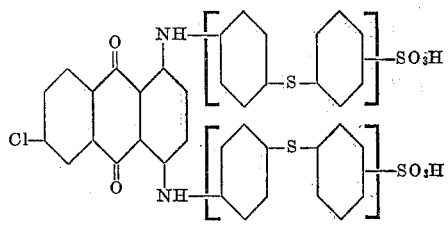

dyes wool, silk and polyamide fibres from a neutral bath in pure green shades which have good fastness to washing, milling and light.

If in the above example the 27.45 parts of 6-chloro-.4-dihydroxy-anthraquinone are replaced by 30.9 parts of 6.7-dichloro-1.4-dihydroxy-anthraquinone, a dyestuff is obtained which dyes wool and silk in similar fast green shades.

*Example 10*

29.8 parts of 1.5-dinitroanthraquinone are stirred for 15 hours at 180–185° with 250 parts of 4-amino-2-chloro-4'-methyldiphenyl sulphide. The condensation is then complete. 300 parts of methanol are added at 60°, the whole is boiled under reflux for 1 hour, the product is filtered off and washed with warm methyl alcohol and finally with hot water. The 1.5-bis-(4'-p-tolylmercapto-3'-chloranilido)-anthraquinone so formed is obtained in a pure form by crystallising from n-butyl alcohol.

10 parts of the condensation product are dissolved in 10 times the amount of sulphuric acid monohydrate and the solution is stirred at 20–30° until a sample is completely water soluble. The dyestuff of the formula:

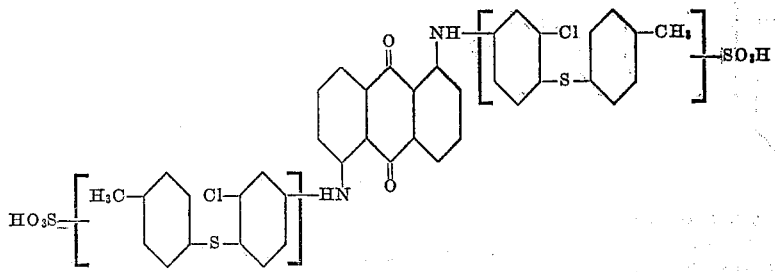

which has been converted into the sodium salt and isolated in the usual way, dyes wool and silk from a neutral bath in fast red-violet shades.

The same dyestuff is obtained if the condensation is performed with 27.7 parts of 1.5-dichloranthraquinone or with 36.6 parts of 1.5-dibromanthraquinone in the presence of 30 parts of potassium acetate and 0.3 part of copper acetate instead of 29.8 parts of 1.5-dinitroanthraquinone.

*Example 11*

81 parts of 4-amino-4'-methoxydiphenyl sulphide (M. P. 94–95°), 8 parts of leuco-1.4-dihydroxy-anthraquinone, 16 parts of 1.4-dihydroxy-anthraquinone, 4 parts of boric acid and 100 parts of n-butyl alcohol are stirred for 20–24 hours at 105–115°. 100 parts of n-butyl alcohol are added to the reaction mass and, after stirring for 1 hour at 80–90°, the precipitate is filtered off. The filter cake is then washed with 70° warm n-butyl alcohol and greatly diluted mineral acid until it is free of amine. By crystallising from organic solvents, the resulting 1.4-bis-(4'-p-methoxyphenylmercapto-anilido)-anthraquinone is obtained in a completely pure state.

10 parts of the dye base are dissolved in 5 to 10 times the amount of sulphuric acid and stirred at 15–40° until a sample dissolves completely in water. The dyestuff, worked up in the usual way, of the formula:

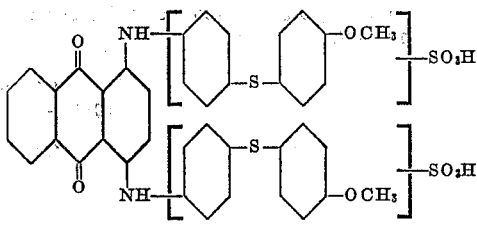

dyes wool and silk from a neutral bath in fast green shades.

A dyestuff with similar good fastness properties is obtained if 15.8 parts of 1-amino-4-hydroxy-anthraquinone are used instead of 16 parts of 1.4-dihydroxy-anthraquinone.

*Example 12*

83 parts of 4-amino-2-chlorodiphenyl sulphide, 24 parts of 1.4-dihydroxy-anthraquinone and 8 parts of 34% hydrochloric acid are stirred at 90–95° in a nitrogenous atmosphere and 2 parts of zinc dust are added in small portions during the stirring process. After adding 5 parts of boric acid, the melt is kept for 16–20 hours at 100–105°. 200 parts of n-butyl alcohol are added, the reaction product which precipitates is filtered off after stirring for 1 hour at 80–90°, purified with hot n-butyl alcohol, greatly diluted mineral acid and water and finally dried. The resulting 1.4-bis-(4-phenylmercapto-3'-chloranilido)-anthraquinone is obtained in a completely pure form by crystallising from organic solvents. It is a dark crystal powder which dissolves in toluene with a green-blue and in concentrated sulphuric acid with a reddish-blue shade.

10 parts of the condensation product are dissolved in 50–100 parts of sulphuric acid and stirred at 15–40° until a sample completely dissolved in water. The dyestuff, which is isolated in the usual way, of the formula:

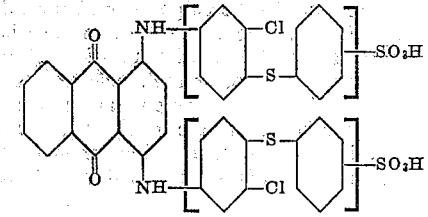

dyes wool, polyamide fibres, charged and uncharged silk in very fast green shades.

If the 83 parts of 4-amino-2-chlorodiphenyl sulphide are replaced by 91 parts of 4-amino-2-chloro-4'-methyl-diphenyl sulphide, a dyestuff is obtained which dyes wool and silk in very fast green shades and which has an excellent drawing power from a neutral bath.

*Example 13*

100 parts of wool flannel are entered at 40–45° into a dyebath containing 1 part of the dyestuff according to Example 3, 3 parts of ammonium sulphate or 5 parts of ammonium acetate and 10 parts of Glaubers salt in 3000 parts of water. The bath is gradually brought to the boil within 45 minutes, kept gently boiling for a further 30 minutes after which the dyed goods are rinsed. A very even green wool dyeing is obtained which has very good fastness to milling, sea water and light.

What we claim is:

1. An acid dyestuff of the anthraquinone series having the general formula:

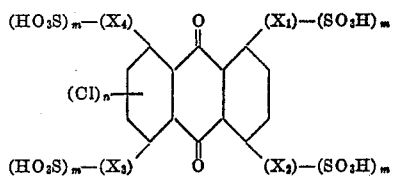

wherein $X_1$ and one of $X_2$, $X_3$ and $X_4$ represent the group —NH—$A_1$—S—$A_2$, the others of $X_2$, $X_3$ and $X_4$ each represents hydrogen, $n$ is a numeral from 0 to 2, each $m$ may be a numeral from 0 to 1 but the sum of the $m$'s is at least 1 and at most 2, $m$ being 0 in the case of said others of $X_2$, $X_3$ and $X_4$, $A_1$ in the above group representing a p-phenylene radical and $A_2$ representing a phenyl radical.

2. An acid dyestuff of the anthraquinone series having the general formula:

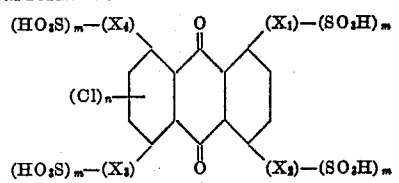

wherein $X_1$ and one of $X_2$, $X_3$ and $X_4$ represent the group

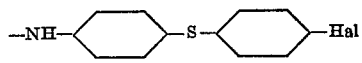

the others of $X_2$, $X_3$ and $X_4$ each represents hydrogen, $n$ is a numeral from 0 to 2, each $m$ may be a numeral from 0 to 1 but the sum of the $m$'s is at least 1 and at most 2, $m$ being 0 in the case of said others of $X_2$, $X_3$ and $X_4$, Hal in the above group representing a halogen atom.

3. An acid dyestuff of the anthraquinone series having the general formula:

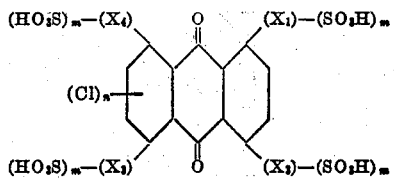

wherein $X_1$ and one of $X_2$, $X_3$ and $X_4$ represent the group

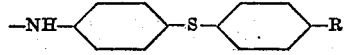

the others of $X_2$, $X_3$ and $X_4$ each represents hydrogen, $n$ is a numeral from 0 to 2, each $m$ may be a numeral from 0 to 1 but the sum of the $m$'s is at least 1 and at most 2, $m$ being 0 in the case of said others of $X_2$, $X_3$ and $X_4$, R in the above group representing an alkyl radical having from 1–5 carbon atoms.

4. An acid dyestuff of the anthraquinone series having the formula:

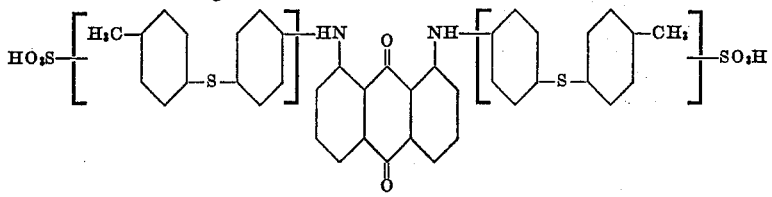

5. An acid dyestuff of the anthraquinone series having the formula:

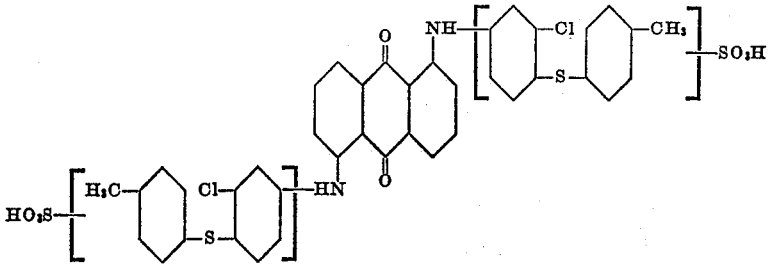

6. An acid dyestuff of the anthraquinone series having the formula:

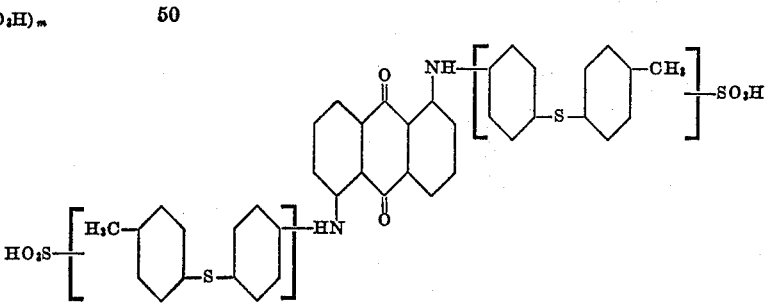

7. An acid dyestuff of the anthraquinone series having the formula:

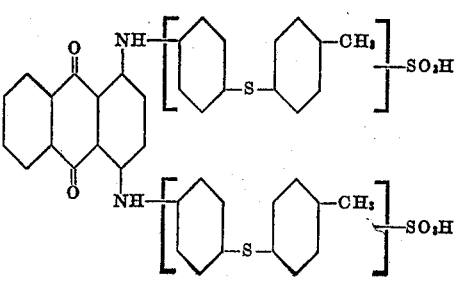

8. An acid dyestuff of the anthraquinone series having the formula:
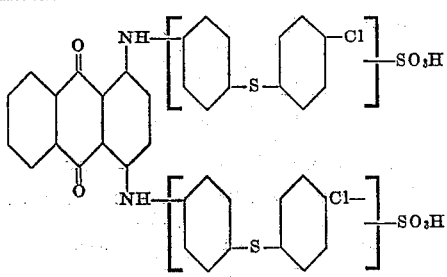
References Cited in the file of this patent
FOREIGN PATENTS
| | | |
|---|---|---|
| 149,710 | Switzerland | Dec. 16, 1931 |
| 597,145 | Germany | May 22, 1934 |